United States Patent Office 3,272,258
Patented Sept. 13, 1966

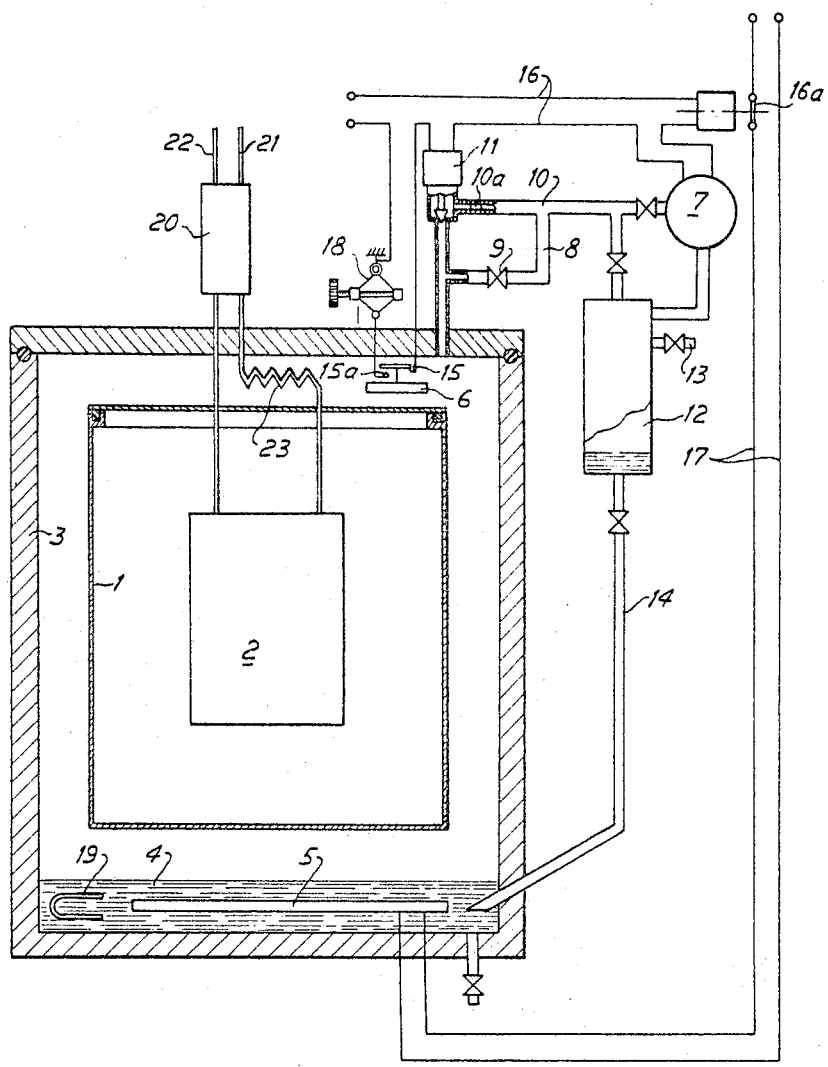

3,272,258
MEANS FOR KEEPING A HIGH DEGREE OF TEMPERATURE STABILITY WITHIN A CHAMBER OF SUBSTANTIAL DIMENSIONS
Fernand Eugene Gabriel Bourquard, 13 Rue Cantin, Courbevoie, Seine, France
Filed Sept. 5, 1963, Ser. No. 306,944
Claims priority, application France, Sept. 5, 1962, 908,692, Patent 1,340,298; Aug. 3, 1963, 943,678, Patent 86,255
1 Claim. (Cl. 165—26)

The present invention relates to the provision of efficient means for keeping at a constant temperature with a high degree of precision a preassigned volume or a tight and closed chamber of substantial dimensions. An object of the present invention is to provide means of the above-mentioned type in a simpler and more efficient manner than heretofore.

Another object of the invention is to provide a stabilization of temperature to a high degree of precision, that is to say within one-tenth to one-thousandths of one degree centigrade.

According to a broad feature of the present invention, a tight and closed chamber within which a predetermined highly constant temperature, higher than that of the surrounding medium, is to be maintained, is placed within a second chamber also tight and closed of appropriate dimensions containing a sufficient quantity of a substance such as a fluid capable of changing state, that is said substance, being in the liquid state at the origin is made to reach the vapor stage under the influence of appropriate heating means associated with said fluid to be heated to a temperature higher than the said predetermined temperature and a corresponding change from the liquid phase to the vapor phase takes place, the smaller chamber being entirely surrounded by said vapor phase resulting from said change of state.

According to another feature of the present invention, the substance which is used to change its phase from liquid phase to vapor phase instead of surrounding entirely the smallest chamber is adapted to flow through coiled tubes of suitable dimensions soldered or otherwise affixed to the walls of said chambers which walls must also be thermally conductive.

According to another feature of the present invention, a temperature regulating system may be added and adapted to impose to the vapor phase a lowering of its temperature within predetermined limits for example by letting out a portion of said vapor phase, which operation is followed by a condensation and a recycling of the corresponding liquid.

According to a further feature of the present invention, means are provided for avoiding "false equilibrium of phases" and resulting differences in the stabilized temperature by setting up within the said fluid adapted to change state compression and expansion mechanical waves and when tubes are used to carry the said fluid, additional means may be provided for facilitating the transmission of said mechanical waves through said tubes.

Such mechanical waves may be generated by any suitable means such as a tuning fork or a microphone and the mechanical waves may be either sonic, ultrasonic or infrasonic waves. Additionally, resonance cavity or cavities may be provided in the fluid circuit.

By a proper choice of the substances constituting the fluid to be heated and vaporized, it is possible to have a series of temperatures at which temperature stabilization with a high degree of precision may be achieved.

According to another feature of the present invention, use may be made of a pure substance having a well defined boiling temperature instead of relying on the dew point of such a substance.

According to still another feature of the invention, the above-mentioned chambers are made of a metal having such a thermal conductivity and thickness that they are thermally practically continuous but mechanically discontinuous in this that the tubes carrying the fluid are located at discrete spots along the surface of said chambers or chambers.

The invention will now be described in connection with two embodiments illustrated in the accompanying drawings, in which the sole figure represents schematically an arrangement embodying features of the present invention and adapted to keep at a substantially constant temperature which may be adjustable a tight and closed chamber of substantial dimensions.

Referring now to the figure, there is shown a closed and gastight chamber 1 made of a metal good conductor of heat within which is placed an equipment, for instance a scientific apparatus 2, which is to be kept at a substantially constant temperature. The closed and gastight chamber 1 is placed within another closed and gastight chamber preferably arranged to avoid thermal radiations. This chamber contains a substance, for example a liquid, which may change from the liquid state to the vapor state by vaporization under the action of heating means incorporated in the chamber, for example, by means of a heating resistance 5 placed in liquid 4, said heating means being capable of raising the temperature of the liquid 4 to a temperature higher than the wanted predetermined temperature. The amount of liquid 4, the position of this liquid in chamber 3 and the position of chamber 1 are such that the chamber 1 is wholly surrounded by the vapor phase resulting from the change of state of said liquid 4.

A regulating system, controlled by a device 6 sensitive to pressure and therefore to temperature, is adapted to cause an adjustable lowering of the temperature within a certain range by discharging out from the system a portion of said vapor phase.

Preferably, and as will be assumed hereinafter, the liquid 4 is chosen according to the range of temperatures within which should be the desired stabilized temperature of chamber 1; this liquid may be water for a range of temperature of 30° C. to 100° C. if the apparatus works under a pressure lower than atmospheric pressure and for higher temperatures, which may reach the critical temperature of water, if the apparatus works under pressures higher than atmospheric pressure.

The vapor phase surrounding chamber 1 is then constituted by a mixture of air and water vapor and substantially solely of water vapor if care has been taken, as this is advisable, to draw out all the air existing in chamber 1 and also the air dissolved in water.

The operation of such a device is as follows:

Under permanent conditions of operation, the surrounding medium has a tendency to cool the wall of chamber 3 and condensation takes place on this inner face of said wall, which develops a certain amount of compensating heat, leading to a lowering of the pressure, quickly compensated by vaporising of a portion of the liquid 4 under the action of heating means 5 which should be of sufficient capacity for establishing in chamber 3 a pressure and a temperature higher than those wanted. Such a variation leads automatically, through the action of the pressure sensitive element 6, to an evacuation of vapor tending to re-establish the initial temperature and pressure conditions, that is to say those that are to prevail permanently in chamber 3.

It should be noted that, if the regulation temperature, i.e. the temperature at which the closed chamber 1 must be maintained, is lower than that of the medium in which chamber 3 is located, it would suffice, to return to the conditions of the preceding example, to place this chamber 3 within a protecting envelope, at a temperature lower than said regulation temperature.

Under these circumstances, the temperature of the wall of chamber 1 will be over all its area brought and maintained at a very precise value which will be a function, amongst other parameters, of the pressure existing in chamber 3 about chamber 1; initial adjustment of this pressure may be performed for example by means of a pump 7 capable of pumping out vapor from said chamber 3 through a tube 8 provided with a valve 9.

It seems advantageous to use the arrangement shown by the drawings. Chamber 3 is connected with a condenser 12 through a tube 10 provided with a calibrated passage 10a in shunt with respect to tube 8 and controlled by an electrovalve 11, that is to say a valve controlled by electrical means. Said condenser 12 is provided with a vapor drain tube 13 and the liquid formed therein is returned through a recycling pipe 14 to the reserve of liquid 4 in chamber 3, said liquid flowing by gravity from condenser 12 to the bottom part of chamber 3.

Calibrated passage 10a has a section commensurate with the heating means 5.

Pressure sensitive element 6 is an aneroid box arranged to close, when contracting, contacts 15-15a and thus to cause the passage of an electric current through circuit 16. This current causes the opening of valve 11 and the starting of pump 7 and the opening of the switch 16a placed in the circuit 17 of the heating means 5 in order to interrupt or to reduce for a time the heating of the mass of liquid 4.

Initially and as long as the pressure in chamber 3 (read through any known means not shown by the drawing) is above the desired value, valve 9 and drain tube 13 are open so that pump 7 quickly draws out the excess of vapor in chamber 3.

As soon as the pressure in chamber 3 has been reduced to the desired value, valve 9 and drain tube 13 are closed. Pump 7 keeps working but the vapor drawn out, for regulation purposes, from chamber 3 can pass only through calibrated passage 10a.

A possibility of adjusting the critical pressure at which the aneroid box 6 operates and therefore a possibility of adjusting the temperature of chamber 1 is achieved by means of a mechanism 18 of the pantograph type arranged to cause an adjustable displacement of contact 15a and contact 15 controlled by the said capsule.

It should be noted that it is possible to dispense with a pump for recycling the vapor phase and that it would also be possible to replace the aneroid box 6 by a simple liquid manometer, precautions being taken for preventing harmful vapor condensation which might alter the operation of said manometer.

It is possible to activate the vaporization phenomenon of the liquid mass 4 by placing within said liquid mass an apparatus such as a tuning fork 19 provided with means for maintaining it in vibration.

It should be mentioned that when the apparatus 2 placed in chamber 1 must be supplied with a fluid arriving at a temperature different from that of the chamber, in particular lower than this temperature, it will be advisable to provide a temperature exchanger 20 placed between the input circuit 21 and the output circuit 22 for said fluid, said input circuit 21 advantageously including a supplementary exchanger such as for instance a coiled tube 23 placed in chamber 3 so that the fluid arriving into chamber 1 does not practically influence the temperature of the said chamber and thus contributes to the temperature equalizaion of chambers 1 and 3.

I should be noted that, at the start of operation, the heating system may work at a higher regime and this may be obtained by utilizing additional heating means.

The present invention is not limited to the abovementioned embodiments as the invention is capable of many different embodiments and variations in the elements described according to the conditions of use.

What I claim is:

A device which comprises, in combination,
- a first closed gastight chamber to be maintained at a predetermined temperature higher than that of the surrounding medium,
- a heat insulated closed gastight chamber surrounding said first chamber,
- in said heat insulated chamber and outside of said first chamber a substance present both in the state of vapor and in the liquid state,
- said first chamber being located in said heat insulated chamber so as to be surrounded exclusively by the vapor phase of said substance,
- means for heating said substance in the liquid state capable of bringing both of said chambers to a temperature higher than said predetermined temperature, and
- means responsive to the pressure of said vapor phase for evacuating a portion of said vapor to keep the temperature inside the second mentioned chamber at a fixed value, said last mentioned means including a condenser having its top portion in communication with the top portion of said second mentioned chamber and its bottom portion in communication with the bottom of said second mentioned chamber for the return by gravity of the liquid condensed in said condenser.

References Cited by the Examiner

UNITED STATES PATENTS 2,363,118  11/1944  Chamberlain _____ 165—40
2,856,160  10/1958  Kaye et al. _____ 165—32

ROBERT A. O'LEARY, *Primary Examiner.*

A. W. DAVIS, *Assistant Examiner.*